US 9,927,229 B2

(12) United States Patent
Nishita et al.

(10) Patent No.: US 9,927,229 B2
(45) Date of Patent: Mar. 27, 2018

(54) MEASURING DEVICE AND TILT SENSOR

(71) Applicant: Kabushiki Kaisha TOPCON, Tokyo (JP)

(72) Inventors: Nobuyuki Nishita, Tokyo (JP); Satoshi Yanobe, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 281 days.

(21) Appl. No.: 14/838,426

(22) Filed: Aug. 28, 2015

(65) Prior Publication Data

US 2016/0061595 A1    Mar. 3, 2016

(30) Foreign Application Priority Data

Aug. 28, 2014    (JP) ................... 2014-174302

(51) Int. Cl.
*G01B 11/26*    (2006.01)
*G01C 9/20*    (2006.01)
*G01C 15/00*    (2006.01)

(52) U.S. Cl.
CPC ............. *G01B 11/26* (2013.01); *G01C 9/20* (2013.01); *G01C 15/002* (2013.01)

(58) Field of Classification Search
None
See application file for complete search history.

(56) References Cited

U.S. PATENT DOCUMENTS

| 5,313,713 A | 5/1994 | Heger et al. |
| 5,592,745 A | 1/1997 | Heger et al. |
| 5,893,215 A | 4/1999 | Kumagai et al. |
| 5,933,393 A | 8/1999 | Kitajima |
| 5,978,076 A | 11/1999 | Kitajima |
| 2002/0138997 A1 | 10/2002 | Ohtomo et al. |
| 2007/0081146 A1 | 4/2007 | Kumagai et al. |
| 2011/0001986 A1 | 1/2011 | Westermark |

FOREIGN PATENT DOCUMENTS

| CN | 1093255 C | 10/2002 |
| CN | 101960257 A | 1/2011 |
| JP | 2002-286450 A | 10/2002 |

(Continued)

OTHER PUBLICATIONS

The extended European search report issued by the European Patent Office dated Mar. 18, 2016, which corresponds to European Patent Application No. 15182594.0-1557 and is related to U.S. Appl. No. 14/838,426.

(Continued)

*Primary Examiner* — Samantha K Abraham
(74) *Attorney, Agent, or Firm* — Studebaker & Brackett PC

(57) ABSTRACT

A measuring device includes a base unit, a rotational unit rotatably provided on the base unit, a fluid container secured in the base unit, containing fluid forming a free surface, a light emitting system secured in the rotational unit to emit light to the free surface in the fluid container, a light receiving system secured in the rotational unit, including a light receiving element to receive the light reflected by the free surface and generate a light receiving signal, and an arithmetic controller which controls the light emitting system and the light receiving system and calculates a tilt of a rotational axis of the rotational unit according to the light receiving signal of the reflected light from the light receiving element.

4 Claims, 9 Drawing Sheets

(56) References Cited

FOREIGN PATENT DOCUMENTS

| JP | 2007-127628 A | 5/2007 |
|---|---|---|
| WO | 91/05985 A1 | 5/1991 |
| WO | 94/04888 A1 | 3/1994 |

OTHER PUBLICATIONS

The First Office Action issued by the State Intellectual Property Office of People's Republic of China dated Jul. 17, 2017, which corresponds to Chinese Patent Application No. 201510523057.4 and is related to U.S. Appl. No. 14/838,426; with English language translation.

Partial European search report issued by the European Patent Office dated Jan. 25, 2016, which corresponds to European Patent Application No. 15182594.0-1557 and is related to U.S. Appl. No. 14/838,426.

An Office Action; "Notification of Reasons for Refusal" issued by the Japanese Patent Office dated Jan. 23, 2018, which corresponds to Japanese Patent Application No. 2014-174302 and is related to U.S. Appl. No. 14/838,426; with English translation.

MEASURING DEVICE AND TILT SENSOR

CROSS-REFERENCE TO RELATED APPLICATION

The present application is based on and claims priority to Japanese patent application No. 2014-174302, filed Aug. 28, 2014, the disclosure of which is hereby incorporated by reference herein in its entirety.

BACKGROUND

Technical Field

The present invention relates to a measuring device and a tilt sensor which obtain a tilt of a rotational unit rotatably provided in a base unit.

Description of Related Art

For example, in surveying, three-dimensional coordinates of a target object are measured with a distance measuring device such as a total station. Such a measuring device includes an electro-optical distance meter rotatably provided inside a base unit to emit light to a target object, receive reflected light thereby and measure a distance to the target object. The measuring device is required to detect a tilt angle and direction of the rotational axis of a rotational unit of the distance meter relative to a horizontal plane with high precision for precisely finding the three-dimensional coordinates of the target object. Japanese Laid-open Patent Application Publication No. 2007-127628 (Reference), for example, discloses a measuring device which uses a tilt sensor to detect a tilt relative to the horizontal plane by use of a fluid free surface maintaining a level state by gravity. This tilt sensor is provided in the rotational unit of a distance meter so that it is able to detect a tilt of the rotational axis relative to the horizontal plane precisely.

However, there is a problem in the measuring device that since the distance meter is provided in the rotational unit and the fluid free surface in the tilt sensor moves along with the rotation of the rotational unit, it is difficult to precisely detect the tilt of the rotational axis of the distance meter. Thus, there is a room for improvement of the measuring device composed of a base unit and a rotational unit using a fluid free surface in terms of precisely detecting a tilt of the rotational axis of a rotational unit relative to a horizontal plane.

SUMMARY

The present invention aims to provide a measuring device which can detect a tilt angle and direction of the rotational axis of a rotational unit relative to a horizontal plane.

According to one embodiment, a measuring device includes a base unit, a rotational unit rotatably provided on the base unit, a fluid container secured in the base unit, containing fluid forming a free surface, a light emitting system secured in the rotational unit to emit light to the free surface in the fluid container, a light receiving system secured in the rotational unit, including a light receiving element to receive the light reflected by the free surface and generate a light receiving signal, and an arithmetic controller which controls the light emitting system and the light receiving system and calculates a tilt of a rotational axis of the rotational unit according to the light receiving signal of the reflected light from the light receiving element.

DETAILED DESCRIPTION

Hereinafter, a measuring device and a tilt sensor according to different embodiments of the present invention will be described referring to the accompanying drawings.

First Embodiment

Figure 1:
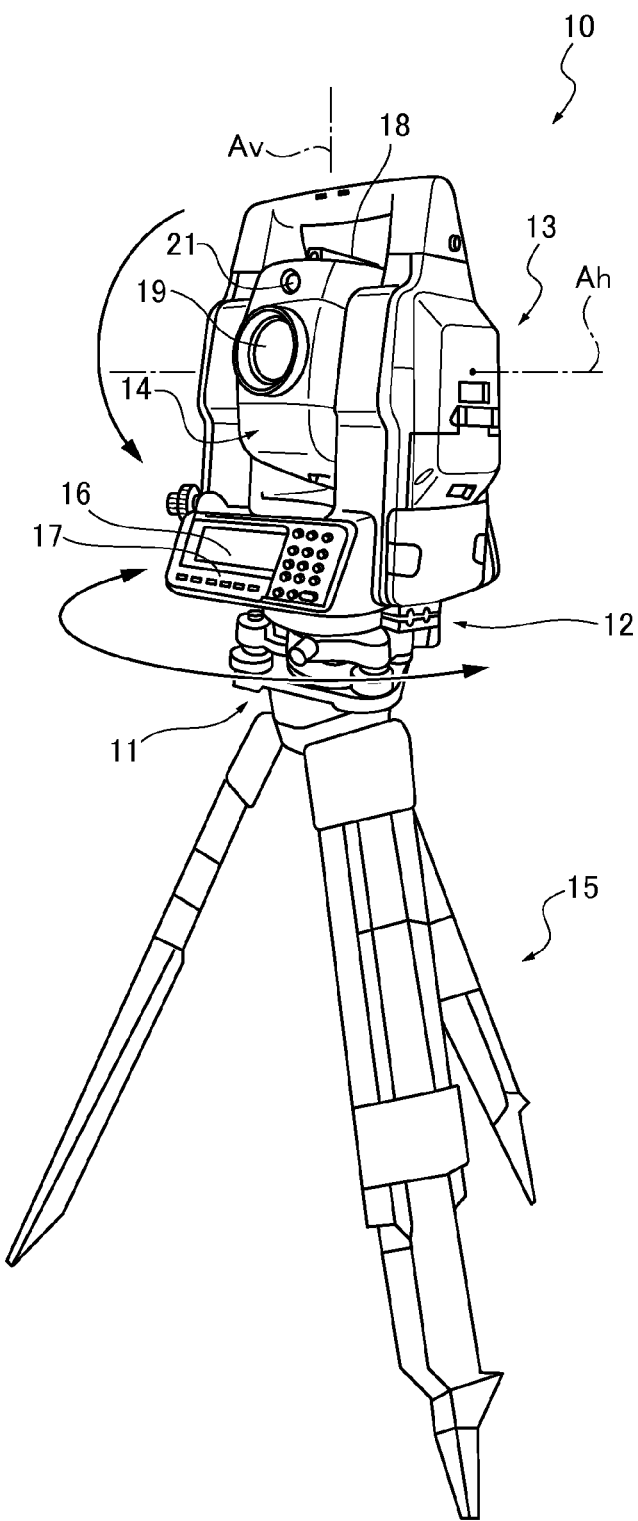
FIG. 1 shows the structure of a measuring device 10 according to a first embodiment of the present invention by way of example.

The structures of a tilt sensor 40 and a measuring device 10 including the tilt sensor 40 are schematically described by way of example. Referring to FIG. 1, the measuring device 10 is a total station which emits pulsed laser beams to a measure point and receives reflected light by the measure point to measure a distance in each pulse, find a mean value of measured distances, and precisely measure a distance to the measure point. The measuring device 10 can be a phase difference measurement type which uses a light beam modulated in a certain frequency, for example and should not limited to the one in the first embodiment. The measuring device 10 includes a level 11, a base unit 12, a bracket 13, and a telescope unit 14.

The level 11 is mounted on a tripod 15. The base unit 12 is provided on the level 11 and the tilt angle of the base unit 12 is changeable relative to the level 11. The bracket 13 as a rotational unit is rotatably provided on the base unit 12 around a vertical rotational axis Av. A display 16 and an operation unit 17 are provided in the bracket 13. The operation unit 17 is a means which an operator manipulates to use various functions of the measuring device 10, and outputs input information to a controller 31 shown in FIG. 2. The display 16 is controlled by the controller 31 to display operation screens and measured results according to an operator's manipulation of the operation unit 17.

Figure 2:
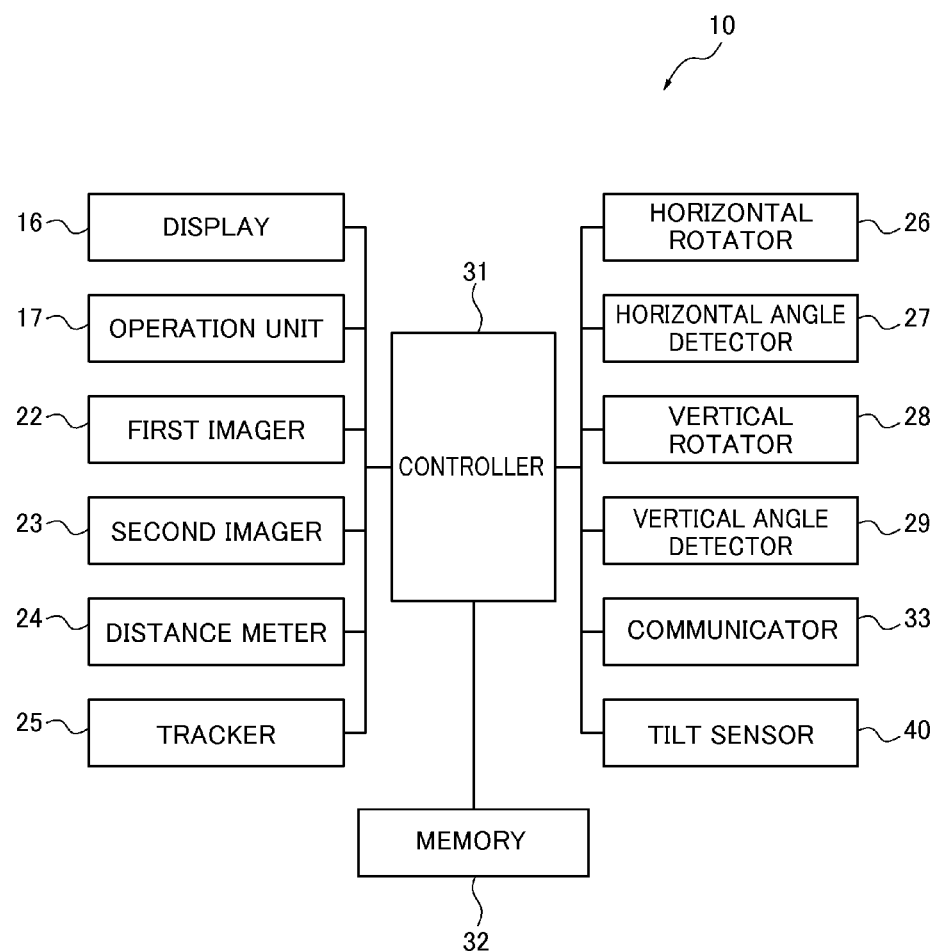
FIG. 2 is a block diagram of the inner structure of the measuring device 10 by way of example.

The telescope unit 14 is provided in the bracket 13 to be rotatable around a horizontal rotational axis Ah relative to the bracket 13. The telescope unit 14 includes a foresight and rear sight 18 which approximately sets a collimated direction of the measuring device 10, a second telescope 19 which collimates a target object, and a first telescope 21 having a lower magnification and a wider field of view than the second telescope 19. The telescope unit 14 further includes a first imager 22 for obtaining a wide-angle image in or about the collimated direction via the first telescope 21 and a second imager 23 for obtaining a telescopic image in the collimated direction via the second telescope 19, as shown in FIG. 2. The first imager 22 and second imager 23 use digital cameras which output a captured image as digital image signals. Further, the telescope unit 14 incorporates a distance meter 24 and a tracker 25 commonly using the optical system of the second telescope 19. The distance meter 24 emits light to a target object and receives reflected light thereby for electro-optically measuring the distance. The tracker 25 projects light to a target object and receives reflected light thereby to detect the position of the target object.

The bracket 13 rotatably holds the telescope unit 14 around the horizontal rotational axis Ah. It includes a horizontal rotator 26 and a horizontal angle detector 27 in FIG. 2. The horizontal rotator 26 rotates the bracket 13 around the vertical rotational axis Av, that is, horizontally, relative to the base unit 12. The horizontal angle detector 27 detects a horizontal rotational angle of the bracket 13 relative to the base unit 12 to detect a horizontal angle in the collimated direction.

Further, the bracket 13 includes a vertical rotator 28 and a vertical angle detector 29 in FIG. 2. The vertical rotator 28 rotates the telescope unit 14 around the horizontal rotational axis Ah, that is, vertically, relative to the bracket 13. The vertical angle detector 29 detects a vertical rotational angle of the bracket 13 relative to the base unit 12 to detect a vertical angle in the collimated direction.

Further, the bracket 13 incorporates the controller 31 (FIG. 2) which integrally controls the operation of the measuring device 10 by a program stored in a memory 32. The memory 32 contains various kinds of programs as calculation programs for measuring and tracking, image processing programs, and data transmission programs.

The controller 31 is connected to the display 16, operation unit 17, first imager 22, second imager 23, distance meter 24, tracker 25, horizontal rotator 26, horizontal angle detector 27, vertical rotator 28, vertical angle detector 29, memory 32, communicator 33, and tilt sensor 40, as shown in FIG. 2.

The communicator 33 enables the communication or data transfer between a controller of a not-shown terminal as a target object of the distance meter 24 and the controller 31. It transmits various kinds of information stored in the memory 32 when appropriate, in response to an instruction from the controller 31.

The tilt sensor 40 detects the tilt angle and direction of the horizontal rotational center (vertical rotational axis Av) of the telescope unit 14 relative to the horizontal plane by detecting a tilt of the vertical rotational axis Av of the bracket 13 relative to the horizontal plane in the first embodiment. It outputs detected results to the controller 31.

The controller 31 receives output values from the distance meter 24, tracker 25, horizontal angle detector 27, vertical angle detector 29, and tilt sensor 40 for distance measurement. The controller 31 calculates distances, an angle of site, and a horizontal angle on the basis of the output values, stores the calculated results in the memory 32, and displays them on the display 16. The images captured by the first and second imagers 22, 23 are output to the controller 31 and stored in the memory 32, when appropriate. The controller 31 performs image processing to the input images or the images stored in the memory 32, stores them in the memory 32, and displays them on the display 16.

The controller 31 controls the horizontal rotator 26 and the vertical rotator 28 to rotate the bracket 13 and the telescope unit 14 to have the telescope 14 direct in a certain direction and scan a certain area. It switches the first telescope 21 and second telescope 19 and controls the first and second imagers 22, 23 to obtain images with a certain magnification. Further, it controls the distance meter 24 to measure a distance to a certain target object. It calculates the angle of site and horizontal angle in the collimated direction to be able to measure the three-dimensional coordinates of the target object precisely by correcting values according to the tilt angle and direction of the vertical rotational axis Av of the telescope unit 14 detected by the tilt sensor 40. Additionally, the controller 31 controls the horizontal rotator 26 and the vertical rotator 28 according to the position of the target object from the tracker 25 to drive the telescope unit 14 to constantly track the target object. Thus, the controller 31 controls the above elements to function as a surveying unit.

Next, the structure of the tilt sensor 40 is described referring to FIG. 3 to FIG. 5B. In the following the positions of the elements described are the ones when the bracket 13 is positioned above the base unit 12 vertically. For better understanding of the tilt sensor 40, the base unit 12 and the bracket 13 are simplified in FIG. 3. Also, for better understanding of the calibration of zero point, the tilt of a primary optical axis O of the tilt sensor 40 relative to the vertical rotational axis Av and reflected light 45 travelling to a light receiving element 46 are emphatically shown in FIGS. 5A, 5B.

Figure 3:
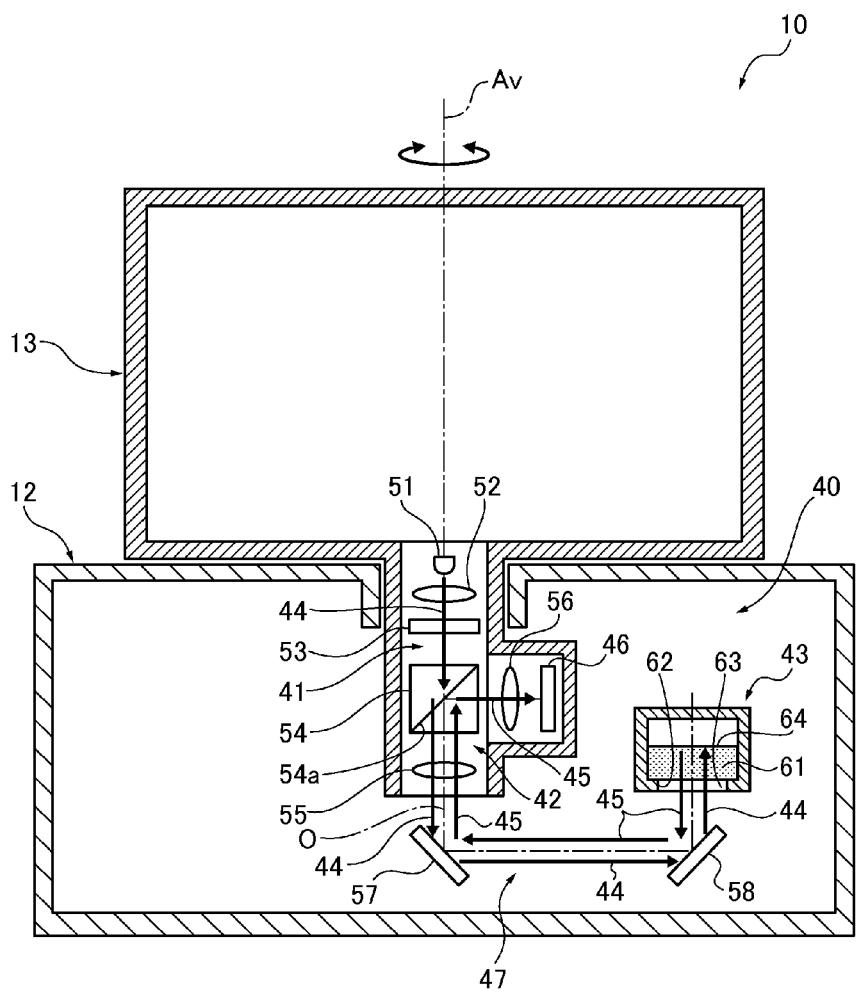
FIG. 3 schematically shows the structure of a tilt sensor 40 of the measuring device 10.

Referring to FIG. 3, the tilt sensor 40 includes a light emitting system 41, a light receiving system 42, and a fluid container 43. The fluid container 43 contains fluid 61 having a free surface 64 which constantly maintains a horizontal state. The light emitting system emits light 44 to the free surface 64 of the fluid 61 of the fluid container 43, and the light receiving system 42 receives the reflected light 45 by the free surface 64. The tilt sensor 40 obtains the tilt angle and direction from the reflected light 45 received by the light receiving element 46 of the light receiving system 42. This is because the direction of emitted light 44 relative to the free surface 64 and the reflected light 45 change in accordance with the tilt angle and direction. Thus, the tilt sensor 40 uses the free surface 64 constantly maintaining a horizontal state to measure an absolute tilt value relative to the horizontal plane.

The light emitting system 41 and light receiving system 42 of the tilt sensor 40 are provided in the bracket 13 while the fluid container 43 is provided in the base unit 12. The bracket 13 is rotatable around the vertical rotational axis Av relative to the base unit 12 and the base unit 12 is unmovably mounted on the tripod 15 via the level 11. Because the fluid container 43 is provided in the stationary base unit 12, the free surface 64 of the fluid container 43 can be stably maintained in a horizontal state.

In the tilt sensor 40 the primary optical axis O of the light emitting system 41 matches the vertical rotational axis Av of the bracket 13 relative to the base unit 12 in order to detect a tilt of the vertical rotational axis Av relative to the horizontal plane. Note that the vertical rotational axis Av may not always match the primary optical axis O due to an assembly tolerance of the light emitting system 41 in the bracket 13. Detailed structure of the tilt sensor 40 is as follows.

The tilt sensor 40 includes a light source 51, a condenser lens 52, a pattern generator 53, a beam splitter 54, a collimator lens 55, a condenser lens 56, and the light receiving element 46 in the bracket 13. It includes a first mirror 57, a second mirror 58, and the fluid container 43 in the base unit 12.

Figure 4:
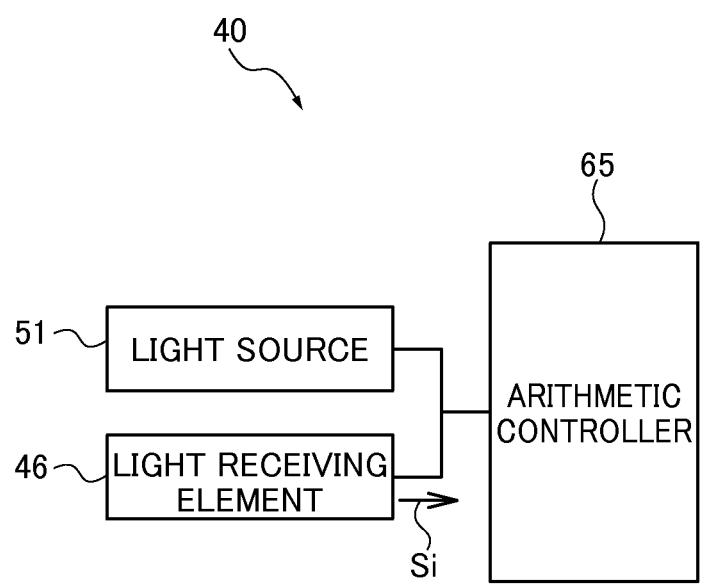
FIG. 4 is a block diagram of the inner structure of the tilt sensor 40.

The light source 51 in the first embodiment is an LED which emits the light 44 to the free surface 64 in the fluid container 43. Referring to FIG. 4, the light source 51 is controlled by an arithmetic controller 65 to turn on and provided on the primary optical axis O to emit the light 44 along the axis O.

The condenser lens 52 is provided on the primary optical axis O to adjust the light 44 into a certain shape and properly emit it to the entire pattern generator 53. The light source 51 can be an arbitrary one as long as it can emit the light 44 to the pattern generator 53 via the condenser lens 52.

The pattern generator 53 is provided on the primary optical axis O to form a measuring pattern for the light 44. The measuring pattern is used for detecting a tilt of the light 44 in two directions (for example, horizontal direction and orthogonal direction relative to FIG. 3) crossing each other in a plane orthogonal to a traveling direction of the light 44. The measuring pattern is known by the above Reference, for example, therefore, detailed description thereof is omitted. The pattern generator 53 transmits the light 44 to brighten the portion corresponding to the measuring pattern and darken the rest of the light 44. Transmitting through the pattern generator 53, the light 44 is converted to the measuring pattern.

The beam splitter 54 is provided on the primary optical axis O and includes an inclined surface 54a to transmit the light 44 and reflect the reflected light 45 through the collimator lens 55 by the inclined surface 54a. A polarizer or a ¼ wavelength plate can be additionally provided on an optical path to the beam splitter 54 in accordance with the structure of the beam splitter 54.

The collimator lens 55 is provided on the primary optical axis O to convert the light 44 from the beam splitter 54 into parallel light. The light source 51, condenser lens 52, pattern generator 53, beam splitter 54, and collimator lens 55 are secured in the bracket 13 and their positional relation is unchanged. The parallel light 44 travels on the primary optical axis O to the first mirror 57 in the base unit 12.

The first mirror 57 then reflects the parallel light 44 to the second mirror 58. The second mirror 58 reflects the parallel light 44 to the fluid container 43 from below.

The fluid container 43 contains fluid 61 having proper viscosity such as silicon oil together with gas and includes an optical aperture 62 in a bottom face. A transmitter 63 is made from a material allowing at least the light 44 to transmit and is fitted into the optical aperture 62. The light 44 can travel in the fluid 61 to the free surface 64 through the optical aperture 62 in the fluid container 43. A boundary between the contained fluid 61 and the gas forms the free surface 64 which maintains a horizontal state by gravity. A part of the light 44 is reflected by the free surface 64 to become the reflected light 45 and the reflected light 45 travels through the optical aperture 62 to below vertically. The reflected light 45 of the light 44 is also a measuring pattern.

The reflected light 45 is reflected by the first mirror 57 and second mirror 58 to the beam splitter 54 through the collimator lens 55 of the bracket 13 and reflected by the inclined surface 54a to the condenser lens 56. The condenser lens 56 images the reflected light on the light receiving element 46. The condenser lens 56 and the collimator lens 55 allow the pattern generator 53 (measuring pattern) and the light receiving element 46 to be conjugated with each other via the free surface 64.

The light receiving element 46 is an area sensor which can obtain a rectangular image along a plane orthogonal to the optical axis of the condenser lens 56. It can be a CCD or CMOS image sensor. The light receiving element 46 receives the reflected light 45 as the measuring pattern and outputs, to the arithmetic controller 65, a light receiving signal Si as a detected value in line with the light receiving amount of each pixel.

The arithmetic controller 65 is connected to the light receiving element 46 and the light source 51, as shown in FIG. 4 to control their driving and receive the light receiving signal Si from the light receiving element 46. It calculates the tilt (tilt angle and direction) of the primary optical axis O of the tilt sensor 40 on the basis of the signal Si. It is able to obtain the tilt from a state of the reflected light 45 or a change in the measuring pattern received on the light receiving element 46 from a norm in a known manner as described in the Reference. The property of the reflected light 45 changes relative to the light 44 due to a refractive index of the fluid 61 while traveling through the fluid 61 and reflected by the free surface 64. Therefore, the arithmetic controller 65 is set to calculate the tilt according to the refractive index of the fluid 61, taking a state of the reflected light 45 relative to the light 44 traveling through the fluid 61 to the free surface 64 into account. It outputs the tilt of the primary optical axis O as a detection signal to the controller 31.

Next, the operation of the tilt sensor 40 for detecting a tilt is described, referring to FIG. 3. First, the arithmetic controller 65 controls the light source 51 in the bracket 13 to emit the light 44 to the entire pattern generator 53 through the condenser lens 52. The light 44 is converted to the measuring pattern through the pattern generator 53 and travels through the beam splitter 54 to the collimator lens 55. The measuring pattern is converted to parallel light by the collimator lens 55 and travels to the first mirror 57 in the base unit 12.

The parallel light 44 is reflected by the first and second mirrors 57, 58 and transmits through the optical aperture 62 of the fluid container 43 to the fluid 61 and the free surface 64. The light source 51, condenser lens 52, pattern generator 53, beam splitter 54, and collimator lens 55 are fixed in the bracket 13 and form the light emitting system 41 to emit the light 44 to the free surface 64 of the fluid container 43. The first mirror 57 and second mirror 58 are secured in the base unit 12 and form an optical guide 47 for the parallel light 44 to the optical aperture 62 of the fluid container 43 from below.

A part of the light 44 is reflected by the free surface 64 to be the reflected light 45 and the reflected light 45 travels from the fluid container 43 to below through the optical aperture 62 of the transmitter 63. The reflected light 45 is then reflected by the second mirror 58 and the first mirror 57 to the beam splitter 54 through the collimator lens 55 and reflected by the inclined surface 54a to the condenser lens 56, and forms a measuring pattern on the light receiving surface of the light receiving element 46.

Thus, the collimator lens 55, beam splitter 54, and condenser lens 56 are fixed in the bracket 13 and form the light receiving system 42 to receive the reflected light 45 by the free surface 64 at the light receiving element 46. The arithmetic controller 65 controls the driving of the light emitting system 41 and the light receiving system 42. In the tilt sensor 40 the light emitting system 41 and the light receiving system 42 use the collimator lens 55 and the beam splitter 54 together. Because of this, the reflected light 45 from the light receiving system 42 can travels on the primary optical axis O of the light emitting system 41 to the beam splitter 54 via the collimator lens 55.

As described above, the arithmetic controller 65 calculates the tilt (tilt angle and direction) of the primary optical axis O of the tilt sensor 40 relative to the horizontal plane on the basis of the light receiving signal Si from the light receiving element 46. Thereby, it can obtain a tilt state of the vertical rotational axis Av of the bracket 13 relative to the horizontal plane.

However, it is very difficult to set the primary optical axis O to completely match the vertical rotational axis Av due to assembly tolerance of the light source 51 and other elements in the bracket 13, in view of satisfying required precision of the tilt sensor 40 which detects a tilt angle in unit of second.

Figure 5A:
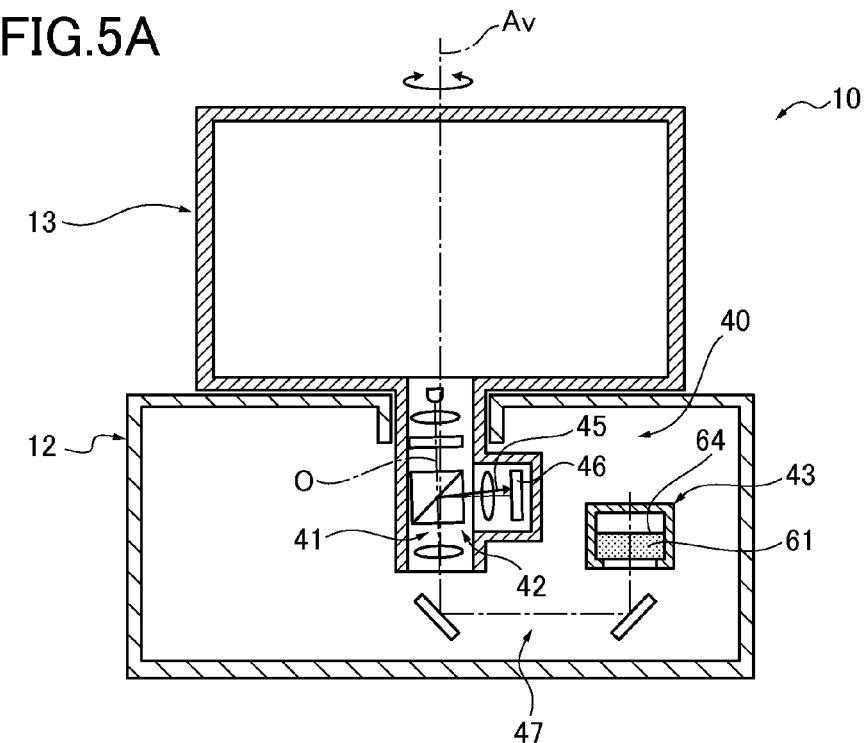
FIG. 5A shows detecting a tilt when the measuring device is in a certain rotational posture and FIG. 5B shows the same when the measuring device is rotated by 180 degrees from the certain rotational posture.
Figure 5B:
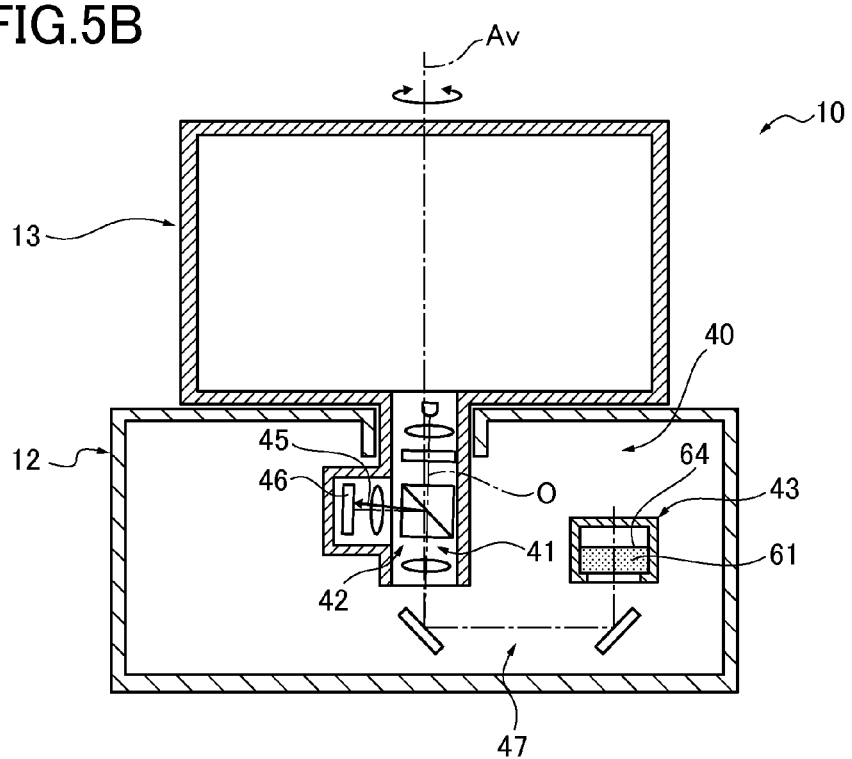

In view of this, the tilt sensor 40 is configured to calibrate zero point as a reference for the tilt detection, that is, the tilt of the primary optical axis O when the vertical rotational axis Av is orthogonal to the horizontal plane. Referring to FIG. 5A, the rotational posture of the bracket 13 around the vertical rotational axis Av is defined to be a certain rotational posture. The tilt of the primary optical axis O can be obtained as described above. For calibration of zero point, the bracket 13 is rotated by 180 degrees around the vertical rotational axis Av to obtain the tilt of the primary optical axis O as shown in FIG. 5B. In comparing the two rotational postures in FIGS. 5A and 5B, the free surface 64 of the fluid container 43 remains in the horizontal state constantly while the primary optical axis O of the tilt sensor 40 is rotationally symmetric to the vertical rotational axis Av. In addition, along with the rotation of the tilt sensor 40 the measuring pattern of the light 44 is rotated, however, a change in the incident position of the reflected light 45 on the light receiving element 46 is constant. That is, in the two rotational postures, the measuring patterns are formed rotationally symmetric to each other on the light receiving surface of the light receiving element 46 in accordance with the tilt of the primary optical axis O relative to the vertical rotational axis Av. Accordingly, it is possible to cancel the tilt of the primary optical axis O of the tilt sensor 40 by calculating a mean value of the two measuring patterns on the light receiving element 46, thereby finding an offset amount appropriate for the zero point of the primary optical axis O. Thus, the tilt sensor 40 is able to calibrate the zero point and negate an error in detected angle due to an axial offset and calculate the tilt angle and direction of the vertical rotational axis Av of the bracket 13 with high precision.

A problem in a known tilt sensor using a fluid free surface is now described.

In a known tilt sensor a fluid container containing fluid having a free surface, a light emitting system and a light receiving system are provided in the same housing of a rotational unit. The fluid container is placed vertically above the light emitting system and the light emitting and receiving systems share a part of optical elements. Because of this, such a tilt sensor can precisely detect the tilt of the rotational axis of the rotational unit including the tilt sensor. However, in a measuring device a rotational unit is rotatable to a base unit so that along with the rotation of the rotational unit, the fluid free surface moves. The tilt sensor works on the premise that the free surface maintains a horizontal state, therefore, it cannot precisely detect a tilt without a stationary free surface.

The measuring device may be able to wait for the free surface to become stable, however, this will bring a decrease in usability and an increase in the work time taken for surveying. For example, with use of a measuring device in an extremely cold place, the viscosity of the fluid in the fluid container rises, taking a longer time to stabilize, which further elongates the work time and lowers usability. Moreover, with use of a measuring device including a tracking function as the measuring device 10 of the first embodiment, the rotational unit is rotated relative to the base unit along with the movement of a target object and the free surface is moved accordingly. It cannot therefore measure the position of the target object accurately while tracking the target. The rotational unit may be rotated at a lower speed not to move the free surface, however, it will also decrease usability and increase the work time. Thus, the known measuring device having the tilt sensor using the free surface cannot accurately detect a tilt of the rotational unit relative to the horizontal plane without lowering usability and increasing the work time.

Meanwhile, in the tilt sensor 40 of the measuring device 10 the fluid container 43 is provided in the stationary base unit 12. Therefore, the fluid free surface 64 in the fluid container 43 is prevented from moving irrespective of the rotation of the bracket 13. Thus, the tilt sensor 40 can precisely detect the tilt angle and direction of the vertical rotational axis Av of the bracket 13 relative to the horizontal plane irrespective of the rotation of the bracket 13.

Further, the free surface 64 remains stationary constantly during the rotation of the bracket 13, so that the measuring device 10 is able to precisely detect the tilt of the vertical rotational axis Av of the bracket 13 even immediately after or in the middle of the rotation of the bracket 13. Thus, the usability of the measuring device 10 can be improved and the work time for distance measurement can be shortened. The use of the measuring device 10 is particularly effective in an extremely cold place, for example.

Moreover, the measuring device 10 can precisely detect the tilt of the vertical rotational axis Av of the bracket 13 relative to the horizontal plane even while tracking a target object with the telescope unit 14 according to information from the tracker 25. Thus, it can accurately measure the position of the target object in the tracking operation.

Moreover, it becomes unnecessary to limit the rotation of the bracket 13 to a lower speed, for example, which can further improve usability and decrease the work time.

Further, the measuring device 10 is configured that the pattern generator 53 generates the measuring pattern of the light 44 and the light receiving element 46 receives the reflected light by the free surface 64. It obtains the measuring pattern from the light receiving signal Si and calculates a tilt of the vertical rotational axis Av on the basis of a change in the measuring pattern from a norm. Thus, the measuring device 10 can further accurately and properly detect a tilt of the vertical rotational axis Av.

Furthermore, owing to the collimator lens 55 of the light emitting system 41, the light receiving element 46 can properly receive the reflected light 45 by the free surface 64 irrespective of a change in the optical distance from the light emitting system 41 of the bracket 13 to the free surface 64 of the base unit 12. Thus, the measuring device 10 can further accurately and properly detect a tilt of the vertical rotational axis Av on the basis of a change in the measuring pattern from a norm.

Further, the measuring device 10 is configured that the light emitting system 41 and the light receiving system 42 commonly use the beam splitter 54 and the collimator lens 55 and the beam splitter 54 transmits the light 44 from the pattern generator 53 and reflects the reflected light 45 from the collimator lens 55 to the light receiving element 46. This can reduce the number of parts and elements of the light emitting and receiving systems 41 and 42 and downsize the measuring device 10 as a whole.

Further, the condenser lens 56 is provided between the beam splitter 54 and the light receiving element 46 to conjugate the pattern generator 53 and the light receiving element 46 with each other via the free surface 64. Because of this, the measuring device 10 can form the measuring pattern by the reflected light 45 on the light receiving element 46 irrespective of a change in the distance between the light emitting system 41 and the free surface in the fluid container 43.

Moreover, the fluid container 43 includes the optical aperture 62 through which the light 44 passes to the free surface 64 from below and the optical guide 47 from the bottom side of the fluid container 43 to the optical aperture 62 when the bracket 13 is placed above the base unit 12 in the measuring device 10. Because of this, the light 44 can travel from the bottom of the fluid container 43 of the base unit 12 to the free surface 64 through the optical aperture 62. Thereby, the measuring device 10 can adopt, for the fluid container 43, a fluid container of a known tilt sensor in which the fluid container having the free surface is placed above a light emitting system. Accordingly, the measuring device 10 can be simply manufactured.

Further, in the measuring device 10 the primary optical axis O does not need to precisely coincide with the vertical rotational axis Av for the accurate detection of the tilt of the vertical rotational axis Av since the zero point is calibrated based on the two different rotational postures of the bracket 13 relative to the base unit 12. This makes it easier to manage the accuracy at which the light emitting system 41 and the light receiving system 42 are mounted in the bracket 13. The measuring device 10 can precisely obtain the tilt of the vertical rotational axis Av.

The measuring device 10 can update the offset amount for the zero point at any time even in the middle of measuring the three-dimensional coordinates of the target object since the free surface 64 remains stationary irrespective of the rotation of the bracket 13. Accordingly, the measuring device 10 can further properly detect the tilt angle and direction of the vertical rotational axis Av of the bracket 13 relative to the horizontal plane.

As described above, the measuring device 10 including the tilt sensor 40 can detect the tilt of the rotational axis of the rotational unit relative to the horizontal plane highly precisely.

Note that in the measuring device 10 according to the first embodiment the bracket 13 is generally positioned above the base unit 12, as shown in FIG. 1. However, the positions of the base unit 12 and the bracket 13 can be inversed, that is, the base unit 12 is placed above the bracket 13. In this case the arithmetic controller 65 is configured to calculate the tilt of the rotational axis on the basis of the refractive index of the fluid 61, taking into account a state of the travelling reflected light 45 relative to the light 44 travelling from a gaseous layer to the free surface 64 in the fluid container 43.

Second Embodiment

A tilt sensor 40A and a measuring device 10A including the tilt sensor 40A according to the second embodiment will be described with reference to FIG. 6, by way of example. The tilt sensor 40A of the second embodiment differs from that 40 of the first embodiment in a fluid container 43A. The measuring device 10A differs from that 10 in the tilt sensor 40A. The rest of the structure is the same as that in the first embodiment so that same or like reference numerals are given to same or like elements and a detailed description thereof is omitted.

Figure 6:
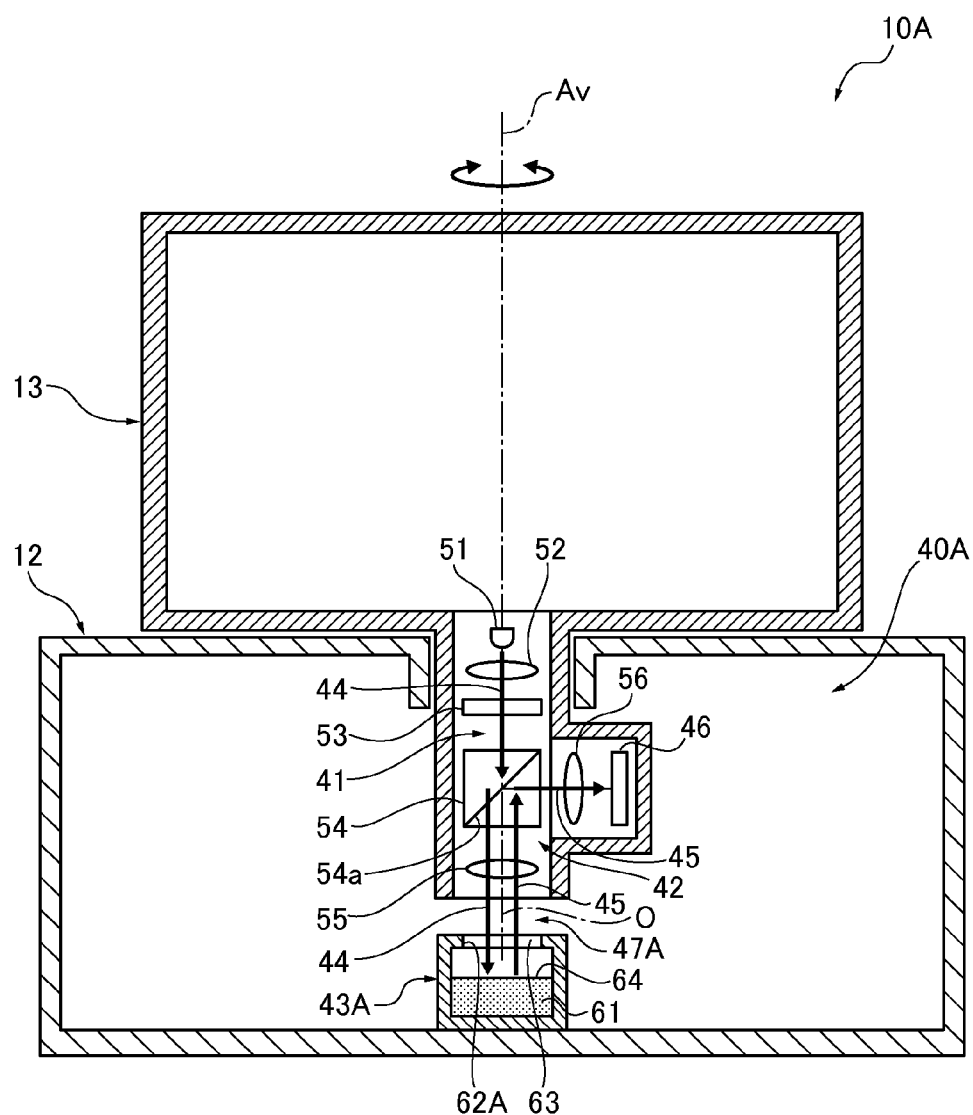
FIG. 6 schematically shows a tilt sensor 40A of a measuring device 10A according to a second embodiment.

Referring to FIG. 6, in the tilt sensor 40A the fluid container 43A is provided on the bottom of the base unit 12 and includes an optical aperture 62A on a top side. The transmitter 63 is fitted into the optical aperture 62A to enclose the aperture. The fluid container 43 is positioned such that the optical aperture 62A is located on the primary optical axis O of the light emitting system 41 of the bracket 13.

In the second embodiment the parallel light 44 converted by the collimator lens 55 of the light emitting system 41 travels to the optical aperture 62A from above without passing through any optical element. A space from the collimator lens 55 to the optical aperture 62A forms an optical guide 47A for the parallel light 44.

As in the first embodiment, the parallel light 44 travels on the primary optical axis O of the light emitting system 41 to the optical aperture 62A of the fluid container 43A. In the fluid container 43A the parallel light 44 travels through the gaseous layer to the free surface as the boundary between the gas and the fluid 61. A part of the light 44 is reflected by the free surface 64 and becomes the reflected light 45. The reflected light 45 travels from the fluid container 43A through the collimator lens 55, beam splitter 54, condenser lens 45 to form a measuring pattern on the light receiving surface of the light receiving element 46.

In the tilt sensor 40 the arithmetic controller 65 calculates the tilt of the rotational axis according to the refractive index of the fluid 61, taking into account the traveling reflected light 45 relative to the light 44 traveling to the free surface from the gaseous layer. Thus, the arithmetic controller 65 of the tilt sensor 40A obtains a tilt angle and direction of the vertical rotational axis Av of the bracket 13 relative to the horizontal plane on the basis of the light receiving signal Si, as in the first embodiment.

The measuring device 10A and tilt sensor 40A of the second embodiment can attain the same effects as those of the first embodiment.

In addition, in the measuring device 10A the light 44 travels to the optical aperture 62 of the fluid container 43 from above. This can simplify the structure of the optical guide 47A in the bracket 13, reduce the number of parts and elements in the bracket 13, and downsize the entire device.

Thus, the measuring device 10A including the tilt sensor 40A according to the second embodiment can precisely detect the tilt angle and direction of the vertical rotational axis Av of the bracket 13 rotatable around the base unit 12 relative to the horizontal plane.

Note that in the measuring device 10A according to the second embodiment the bracket 13 is generally positioned above the base unit 12. However, it can be used with their positions inversed, that is, the base unit 12 is placed above the bracket 13. In this case the arithmetic controller 65 is configured to calculate the tilt of the rotational axis on the basis of the refractive index of the fluid 61, taking into account the traveling reflected light 45 relative to the light 44 travelling from the fluid layer to the free surface 64 in the fluid container 43.

Third Embodiment

Next, a measuring device 10B and a tilt sensor 40B according to a third embodiment are described with reference to FIG. 7 to FIG. 9. The tilt sensor 40B is able to further precisely detect the tilt of the rotational axis when the position of the measuring device 10B is inversed. The measuring device 10B differs from that 10 of the first embodiment in the tilt sensor 40B. The rest of the structure is the same as that in the first embodiment so that same or like reference numerals are given to same or like elements and a detailed description thereof is omitted.

Figure 7:
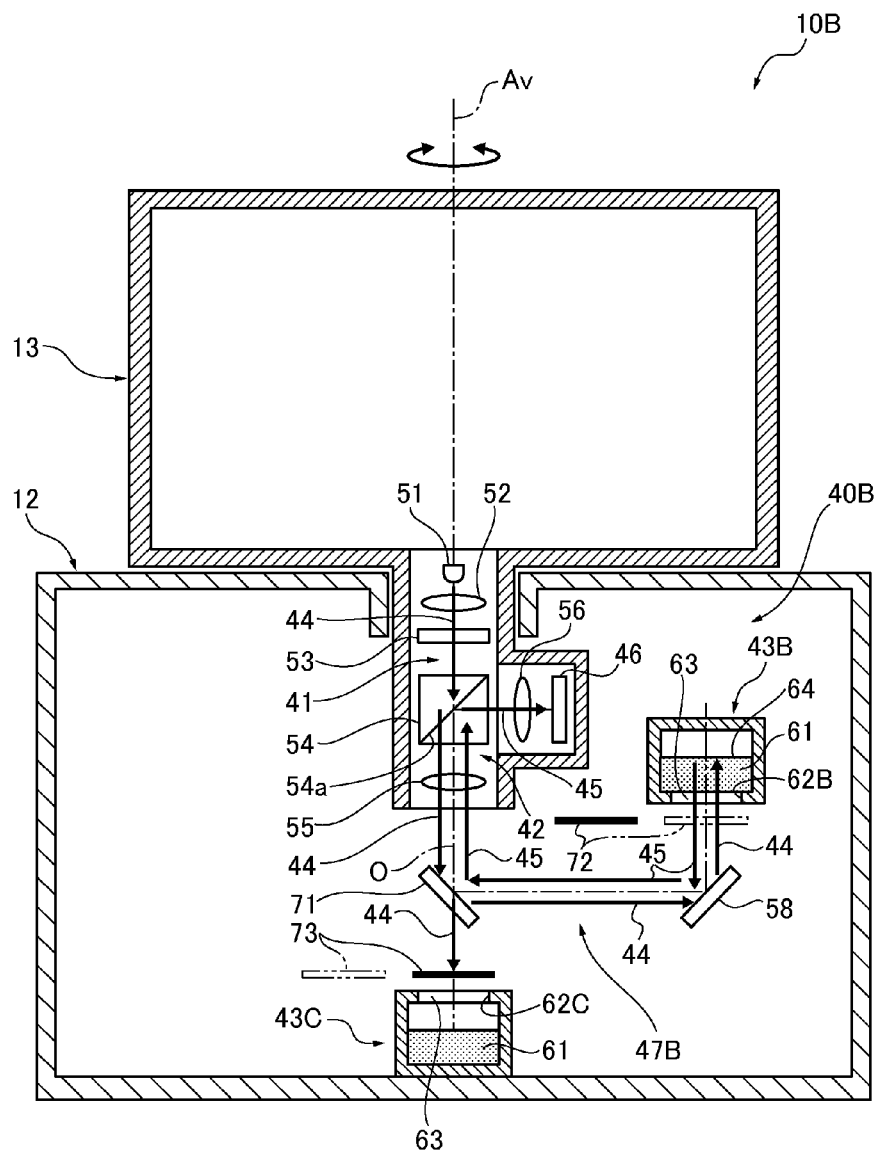
FIG. 7 schematically shows a tilt sensor 40B of a measuring device 10B according to a third embodiment.

Referring to FIG. 7, the tilt sensor 40B of the third embodiment includes a first fluid container 43B and a second fluid container 43C in the base unit 12. The first fluid container 43B includes a first optical aperture 62B on a bottom side and the second fluid container 43C includes a second optical aperture 62C on a top side as the fluid container 43 of the first embodiment. The second optical aperture 62C of the second fluid container 43C is opened upward on the primary optical axis O of the light emitting system 41, therefore, it is substantially the same as the fluid container 43A of the second embodiment.

A first mirror 71, a second mirror 58, a first shutter 72 and a second shutter 73 are additionally provided in the base unit 12. The first mirror 71 is a half mirror on the primary optical axis O to reflect a part of the parallel light 44 from the collimator lens 55 to the second mirror 58 and transmit the rest of the parallel light 44 therethrough. The first mirror 71 can be an arbitrary optical element as long as it can reflect a part of the light 44 to the second mirror 58 and transmit the rest of the light 44 therethrough. The second mirror 58 reflects the parallel light 44 to the first fluid container 43B from below.

Figure 8:
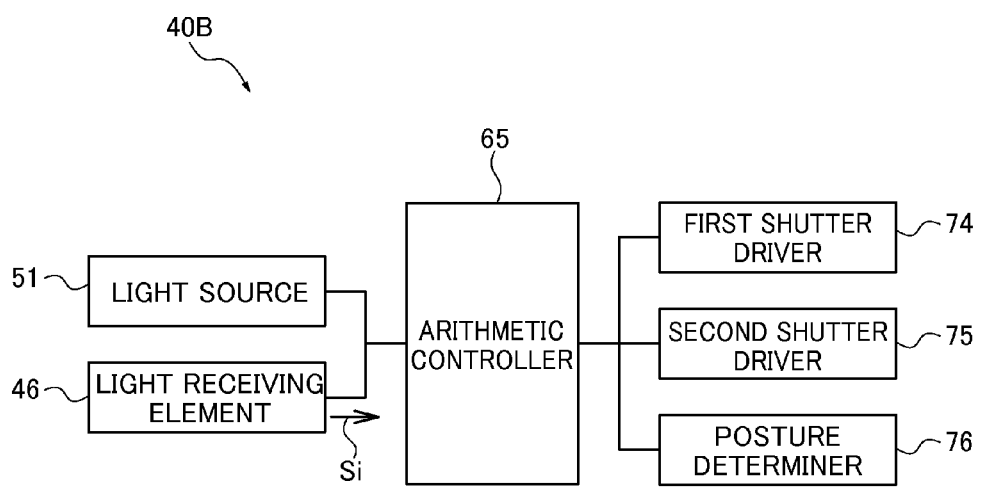
FIG. 8 schematically shows the inner structure of the tilt sensor 40B.
Figure 9:
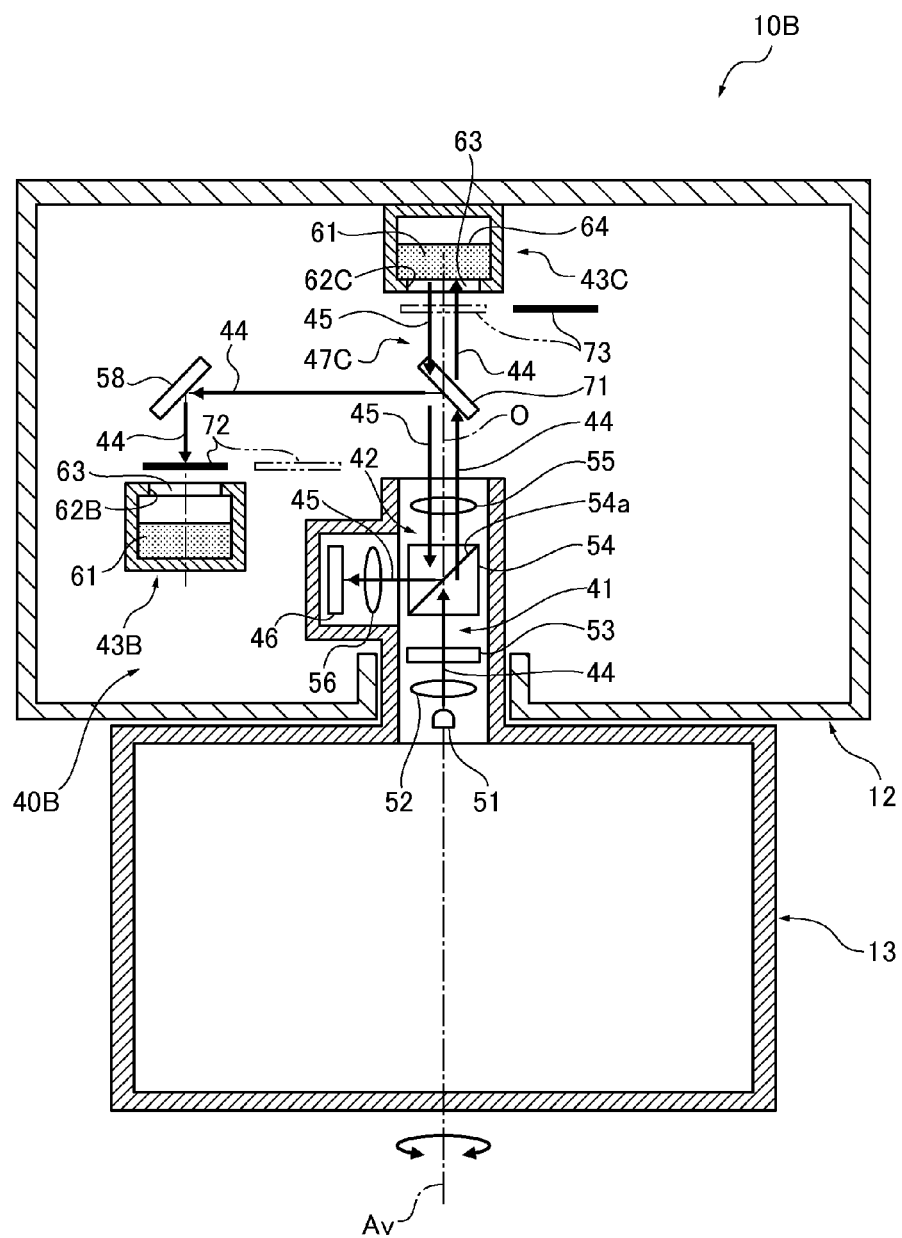
FIG. 9 schematically shows the measuring device 10B in an inversed posture.

The first shutter 72 is provided to be inserted between the second mirror 58 and the first optical aperture 62B of the first fluid container 43B and movable by a first shutter driver 74 (FIG. 8) between an inserted position in FIG. 7 and a non-inserted position in FIG. 9. When inserted, the first shutter 72 prevents the light 44 and the reflected light 45 from traveling between the second mirror 58 and the first optical aperture 62B. When not inserted, the first shutter 72 allows the light 44 and the reflected light 45 to travel between the second mirror 58 and the first optical aperture 62B.

The second shutter 73 is provided to be inserted between the first mirror 71 and the second optical aperture 62C of the second fluid container 43C and movable by a second shutter driver 75 (FIG. 8) between an inserted position in FIG. 7 and a non-inserted position in FIG. 9. When inserted, the second shutter 73 prevents the light 44 and the reflected light 45 from travelling between the first mirror 71 and the second optical aperture 62C. When not inserted, the second shutter 73 allows the light 44 and the reflected light 45 to travel between the first mirror 71 and the second optical aperture 62C.

As shown in FIG. 8, the arithmetic controller 65 is connected to the first shutter driver 74, the second shutter driver 75, and a posture determiner 76 in addition to the light receiving element 46 and the light source 51. The arithmetic controller 65 controls the first and second shutter drivers 74 and 75 to drive the first and second shutters 72 and 73 in such a manner that when one is located in the inserted position, the other is located in the non-inserted position.

The posture determiner 76 determines if the tilt sensor 40B or measuring device 10B is in a general posture or an inversed posture and outputs a result as a signal to the arithmetic controller 65. The general posture refers to the one when the bracket 13 is positioned above the base unit 12, as shown in FIG. 7. The inversed posture refers to the one when the bracket 13 is positioned below the base unit 12, as shown in FIG. 9. In the present embodiment the posture determiner 76 includes a switch with which the general posture and the inversed posture are switched. The arithmetic controller 65 determines the posture of the measuring device 10B in accordance with a manipulation of the posture determiner 76 to control the positions of the first and second shutters 72 and 73. The posture determiner 76 can be a posture sensor which is able to detect the general posture and inversed posture of the measuring device 10B. It should not be limited to the one in the third embodiment.

Upon receiving a signal indicating that the measuring device 10B is in the general posture in FIG. 7 from the posture determiner 76, the arithmetic controller 65 controls the first shutter 72 to be placed in the non-inserted position and the second shutter 73 to be placed in the inserted position. In the base unit 12 the parallel light 44 reflected by the first mirror 71 and the second mirror 58 travels to the first optical aperture 62B of the first fluid container 43C. The first and second mirrors 71, 58 thus form a first optical guide 47B.

Upon receiving a signal indicating that the measuring device 10B is in the inversed posture in FIG. 9 from the posture determiner 76, the arithmetic controller 65 controls the first shutter 72 to be placed in the inserted position and the second shutter 73 to be placed in the non-inserted position. In the base unit 12 the parallel light 44 transmitting through the collimator lens 55 and the first mirror 71 travels to the second optical aperture of the second fluid container 43C. The first mirror 71 forms a second optical guide 47C. Thus, the first shutter 72 and the second shutter 73 function as an optical path switch to selectively switch the first optical guide 47B and the second optical guide 47C.

When the measuring device 10B is in the general posture in FIG. 7, in the base unit 12 a part of the parallel light 44 is reflected by the first and second mirrors 71, 58 to the first fluid container 43B and travels in the fluid 61 and is reflected by the free surface 64. Then, the reflected light 45 as a part of the light 44 travels through the first optical aperture 62B and is reflected by the second mirror 58 and the first mirror 71 to the collimator lens 55 of the bracket 13. The reflected light 45 travels through the collimator lens 55, beam splitter 54, and condenser lens 56 to form a measuring pattern on the light receiving element 46. In the tilt sensor 40B, by the second shutter 73 in the inserted position, the light 44 is prevented from reaching and being reflected by the free surface 64 in the second fluid container 43C to the light receiving element 46.

As in the tilt sensor 40 of the first embodiment, the arithmetic controller 65 calculates the tilt of the rotational axis according to the refractive index of the fluid 61, taking into account the traveling reflected light 45 relative to the light 44 traveling through the fluid 61 to the free surfaces 64 in the first and second fluid containers 43B, 43C. The arithmetic controller 65 thus obtains the tilt angle and direction of the vertical rotational axis Av of the bracket 13 in accordance with the light receiving signal Si.

Further, when the measuring device 10B is in the inversed posture in FIG. 9, in the base unit 12 a part of the parallel light 44 transmits through the first mirror 71 to the second fluid container 43C which is in the inverted state. That is, the second optical aperture 62C is at the bottom and the fluid 61 as a fluid layer is above the second optical aperture 62C. The light 44 travels in the fluid 61 to the free surface 64 and is reflected by the free surface 64. Then, the reflected light 45 travels through the first mirror 71 to the collimator lens 55 of the bracket 13. The reflected light 45 travels through the collimator lens 55, beam splitter 54, and condenser lens 56 to form a measuring pattern on the light receiving element 46. In the tilt sensor 40B, by the first shutter 72 in the inserted position, the light 44 is prevented from reaching and being reflected by the free surface 64 in the first fluid container 43B to the light receiving element 46.

As in the tilt sensor 40 of the first embodiment, the arithmetic controller 65 calculates the tilt of the rotational axis according to the refractive index of the fluid 61, taking into account the traveling reflected light 45 relative to the light 44 traveling in the fluid 61 to the free surfaces 64 in the first and second fluid containers 43B, 43C. The arithmetic controller 65 thus obtains the tilt angle and direction of the vertical rotational axis Av of the bracket 13 in accordance with the light receiving signal Si.

Thus, the measuring device 10B and the tilt sensor 40 can attain the same effects as those of the first embodiment.

In addition, irrespective of the posture of the measuring device 10B, the tilt sensor 40B can precisely detect the tilt angle and direction of the vertical rotational axis Av of the bracket 13 relative to the horizontal plane.

Further, the measuring device 10B additionally includes the first fluid container 43B and first optical guide 47B, the second fluid container 43C and second optical guide 47C, and the optical path switch in the base unit 12. Because of this, the measuring device 10B of a simple structure can precisely detect the tilt angle and direction of the vertical rotational axis Av of the bracket 13 relative to the horizontal plane both in the general posture and in the inversed posture.

In the measuring device 10B the first and second fluid containers 43B, 43C are structured the same. The first fluid container 43B includes the first optical aperture 62B at the bottom and the second fluid container 43C includes the second optical aperture 62C at the top. The measuring device 10B is configured to use one of the first and second fluid containers 43B, 43C in the general posture and use the other of them in the inversed posture. Because of this, the measuring device 10B of a simple structure can further precisely and properly detect the tilt angle and direction of the vertical rotational axis Av of the bracket 13 relative to the horizontal plane both in the general posture and in the inversed posture.

Further, with the above configuration, irrespective of whether the measuring device 10B is in the general posture or in the inverted posture, a change in the measuring pattern formed on the light receiving element 46 from a norm can remain constant. Thus, the measuring device 10B can calculate the tilt of the rotational axis relative to the horizontal plane in the same manner both in the general posture and in the inverted posture. Because of this, the measuring device 10B of a simple structure can precisely and properly detect the tilt angle and direction of the vertical rotational axis Av of the bracket 13 relative to the horizontal plane both in the general posture and in the inversed posture.

Further, in the measuring device 10B the optical path switch includes the first shutter 72, second shutter 73, first shutter driver 74, and second shutter driver 75. This makes it possible to simplify the structure of the device 10B and securely prevent the reflected light 45 from the unused fluid container from entering the light receiving element 46. Because of this, the measuring device 10B of a simple structure can precisely detect the tilt angle and direction of the vertical rotational axis Av of the bracket 13 relative to the horizontal plane both in the general posture and in the inversed posture.

Thus, the measuring device 10B or the tilt sensor 40B according to the third embodiment can precisely detect the tilt angle and direction of the rotational axis of the rotational unit relative to the horizontal plane.

The third embodiment has described an example where the first fluid container 43B is used in the general posture and the second fluid container 43C is used in the inverted posture. The present invention should not be limited to such an example. The first fluid container 43B can be used in the inverted posture and the second fluid container 43C can be used in the general posture. In this case, the arithmetic controller 65 calculates the tilt of the rotational axis on the basis of the refractive index of the fluid 61, taking into account the travelling reflected light 45 relative to the light 44 traveling from the gaseous layer to the free surface 64 in the first and second fluid containers 43B, 43C.

Further, the optical path switch can be arbitrarily configured as long as it can selectively switch the first optical guide 47 and the second optical guide 47C, in addition to the one in the third embodiment.

Further, the embodiments of the present invention have been described using the measuring devices 10, 10A, and 10B as examples. The present invention should not be limited to the examples. The measuring device can be arbitrarily configured as long as it includes a base unit, a rotational unit rotatable relative to the base unit, a fluid container secured in the base unit, containing fluid forming a free surface, a light emitting system secured in the rotational unit to emit light to the free surface in the fluid container, a light receiving system secured in the rotational unit, including a light receiving element to receive the light reflected by the free surface and generate a light receiving signal, and an arithmetic controller which controls the light emitting system and the light receiving system and calculates a tilt of the rotational axis of the rotational unit according to the light receiving signal of the reflected light from the light receiving element.

Further, the above embodiments of the present invention have been described using the tilt sensors 40, 40A, and 40B as examples. The present invention should not be limited thereto. It can be arbitrarily configured as long as a base unit, a fluid container secured in the base unit, containing fluid forming a free surface, a rotational unit rotatable relative to the base unit, a light emitting system secured in the rotational unit to emit light to the free surface in the fluid container, a light receiving system secured in the rotational unit, including a light receiving element to receive the light reflected by the free surface, and an arithmetic controller which controls the light emitting system and the light receiving system and calculates a tilt of a rotational axis of the rotational unit according to a light receiving signal of the reflected light from the light receiving element.

Further, the above embodiments have described an example where the tilt sensors 40, 40A, and 40B are included in the measuring devices 10A, 10B, 10C which are total stations. However, the tilt sensor according to any of the embodiments is applicable to other types of measuring device which includes a base unit and a rotational unit rotatable relative to the base unit and is used for surveying, measuring, and BIM (building information modeling). For example, it is applicable to a theodolite, a 3D scanner, a laser pointer, and a level meter.

The above embodiments have described an example where the light 44 forming a measuring pattern generated by the pattern generator 53 illuminates the fluid free surface in the fluid container 43. However, the present invention should not be limited to such an example. Alternatively, the light emitting system 41 can emit the light 44 to the free surface and the reflected light 45 is received by the light receiving element 46 of the light receiving system 42. The arithmetic controller 65 can calculate the tilt of the rotational axis of the rotational unit according to the light receiving signal Si received by the light receiving element 46. For instance, the light emitting system 41 can be configured to emit a point light source or other kinds of light to the free surface 64.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A measuring device comprising:
a base unit;
a rotational unit rotatably provided on the base unit;
a first fluid container and a second fluid container secured to the base unit, and containing fluid forming a free surface;
a light emitting system secured in the rotational unit to emit light to the free surface in the first fluid container and the second fluid container;
a light receiving system secured in the rotational unit, including a light receiving element to receive the light reflected by the free surface and generate a light receiving signal; and
an arithmetic controller which controls the light emitting system and the light receiving system and calculates a tilt of a rotational axis of the rotational unit according to the light receiving signal of the reflected light from the light receiving element,
wherein the light emitting system includes a pattern generator which generates a measuring pattern for the light; and
the arithmetic controller calculates the tilt of the rotational axis of the rotational unit according to the measuring pattern of the reflected light received by the light receiving element,
wherein the light emitting system includes a collimator lens which converts the light having the measuring pattern into parallel light,
wherein the base unit including:
the first fluid container having a first optical aperture on a bottom side through which the light transmits to the free surface from below and the second fluid container having a second optical aperture on a top side through which the light transmits to the free surface from above when the rotational unit is placed above the base unit vertically:
a first optical guide that includes a first mirror and a second mirror to guide the parallel light from the light emitting system to the first optical aperture of the first fluid container and a second optical guide that includes the first mirror to guide the parallel light from the light emitting system to the second optical aperture of the second fluid container; and
an optical path switch which is provided on the first and second optical guides, selectively switches the first optical guide and the second optical guide, and controls the light and the reflected light to transmit through one of the first and second optical guides, and not to transmit through the other of the first and second optical guides,
wherein the parallel light from the light emitting system is guided to and received by the light receiving system through the first optical guide or the second optical guide selected by the optical path switch.

2. The measuring device according to claim 1, wherein:
the light emitting system includes a light source which emits the light to the pattern generator and a beam splitter provided between the pattern generator and the collimator lens;
the light receiving system commonly uses the collimator lens and the beam splitter with the light emitting system; and
the beam splitter transmits the light from the pattern generator to the collimator lens and reflects the reflected light from the collimator lens to the light receiving element.

3. The measuring device according to claim 2, wherein:
the light receiving system includes a condenser lens between the beam splitter and the light receiving element; and
the condenser lens and the collimator lens function to conjugate the pattern generator and the light receiving element with each other via the free surface.

4. The measuring device according to claim 1, wherein the arithmetic controller calibrates a zero point according to different tilts of the rotational axis calculated based on a first light receiving signal and a second light receiving signal of the reflected light by the free surface received by the light receiving element, the first light receiving signal obtained when the rotational unit is placed in a certain rotational posture relative to the base unit, the second light receiving signal obtained when the rotational unit is rotated by 180 degrees from the certain rotational posture relative to the base unit.

* * * * *